(12) United States Patent
Lustiger

(10) Patent No.: US 6,191,218 B1
(45) Date of Patent: Feb. 20, 2001

(54) METHOD FOR IMPROVING HOT TACK IN BLOWN POLYETHYLENE FILMS

(75) Inventor: Arnold Lustiger, Edison, NJ (US)

(73) Assignee: Exxon Research and Engineering Company, Florham Park, NJ (US)

(*) Notice: Under 35 U.S.C. 154(b), the term of this patent shall be extended for 0 days.

(21) Appl. No.: 09/115,076

(22) Filed: Jul. 14, 1998

(51) Int. Cl.⁷ .................................... C08L 33/02
(52) U.S. Cl. ..................... 525/78; 525/74; 525/326.1
(58) Field of Search .................. 525/74, 78, 328.1

(56) References Cited

U.S. PATENT DOCUMENTS

| | | | |
|---|---|---|---|
| 3,886,227 | * 5/1975 | VanBrederode et al. | 260/836 |
| 5,001,176 | * 3/1991 | Nakazima | 524/48 |

FOREIGN PATENT DOCUMENTS

| | | | |
|---|---|---|---|
| 0292007 | 11/1988 | (EP) | G03C/3/00 |
| 0598626 | 5/1994 | (EP) | C08L/23/04 |
| 9513317 | 5/1995 | (WO) | C08K/5/05 |
| 9520625 | 8/1995 | (WO) | C08K/5/09 |

* cited by examiner

*Primary Examiner*—David W. Wu
*Assistant Examiner*—Ling Siu Choi
(74) *Attorney, Agent, or Firm*—Gerard J. Hughes; Kenneth W. Peist

(57) ABSTRACT

The invention is directed towards a method for improving hot tack in blown polyethylene films. Accordingly, a nucleating agent and polyethylene are combined to form a melt from which the film is blown. The method comprises forming a melt of polyethylene and a nucleating agent selected from the group consisting of dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof. Polyethylene films having increased hot tack can be blown therefrom.

5 Claims, No Drawings

METHOD FOR IMPROVING HOT TACK IN BLOWN POLYETHYLENE FILMS

FIELD OF THE INVENTION

The invention is directed towards increasing the property known as hot tack in blown polyethylene films.

BACKGROUND OF THE INVENTION

Polyolefin films, especially polyethylene films, are frequently formed as blown films. Film blowing involves continuously extruding a polymer melt through a die in order to form a continuous cylinder of viscous polymer, and then expanding the diameter of the cylinder through, for example, a pressure differential between the inside and outside of the cylinders.

Bags may be formed by collapsing the polymer cylinder along its diameter perpendicular to the extruding (machine) direction in order to provide two parallel layers of polyethylene film, the two layers being contiguous along two parallel edges separated by a width of approximately II times the radius of the cylinder. The bag's sealed end is formed by heating the layers sufficiently to form a small region of polymer interdiffusion between the layers along a line traversing the width of the bag from edge to edge. Such a line is generally perpendicular to the extruding direction and may be formed by narrow, heated, metal bars that contact the outer surfaces of the layers.

The film may also be formed into a continuous sheet. When the cylinder is at a desired radius approximately equal to II times the reciprocal of the width of a take-up spool and the cylinder's wall thickness is approximately equal to the desired film thickness, the film is parted longitudinally and then wound onto the take-up spool.

A critical property in polymer packaging, especially in the formation of bags, applications is known as "hot tack". Hot tack is the strength of a heat seal immediately after sealing and before the seal has cooled down and reached maximum strength. Bags formed from polymer film having improved hot tack are less prone to fail during and after processing along the region of polymer interdiffusion that forms the closed end of the bag. In one hot tack determination method, the automatic heat sealing packaging process is simulated by forming heat seals and testing them in a short period of time, i.e. less than one second.

Hot tack determines the maximum packaging speed. See for example, U.S. Pat. No. 3,478,131. It is believed that both the melting and crystallization of a polymer behavior strongly affects its hot tack properties. Materials having desirable hot tack display a low melting point and a broad melting endotherm in a differential scanning calorimeter, allowing heat seals to form at the lowest possible temperature. It is also desirable that the material solidifies, or crystallizes at a temperature as possible so that the heat seals develop strength quickly.

Blown films prepared from conventional Ziegler-Natta catalyzed polyethylene suffers from relatively poor hot tack compared to metallocene catalyzed polyethylene. This difference is believed to result from the metallocene based material's broader melting endotherm. However, further hot tack improvement would be desirable even in metallocene-catalyzed polyethylene.

SUMMARY OF THE INVENTION

In one embodiment, the invention is a method for providing a polyethylene melt from which films of increased hot tack strength can be formed, the method comprising forming a melt of polyethylene and a nucleating agent selected from the group consisting of dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof.

In another embodiment, the invention is a polymer composition of improved hot tack comprising polyethylene and a nucleating agent selected from the group consisting of dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof.

In still another embodiment, the invention is a method for improving hot tack in polyethylene film formed from a resin comprising combining the resin with a nucleating agent selected from the group consisting of dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof.

DETAILED DESCRIPTION OF THE INVENTION

The invention is based on the discovery that adding or combining a nucleating agent to or with polyethylene significantly increases the polyethylene's hot tack properties. It is believed that nucleating agents raise the crystallization temperature of the melt, and suppress primary crystallization in favor of secondary crystallization, resulting in a broadening of the polyethylene's melting endotherm and lowering its melting point.

Hot tack can be improved in polyethylene films blown from a resin melt by forming the melt from a nucleating agent and polyethylene. Nucleating agents useful in the practice of the invention include dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof. The preferred nucleating agents are ethylene copolymers containing grafted maleic anhydride, ethylene copolymers containing grafted acrylic acid, and mixtures thereof, with acrylic acid—ethylene copolymers being particularly preferred. The additive may also be used together with sodium stearate as an acid neutralizing agent present in a concentration ranging from about 0.005 wt. % to about 0.1 wt. % based on the weight of the polyethylene and nucleating agent. The preferred concentration of sodium stearate, when present, ranges from about 0.01 wt. % to about 0.1 wt. % based on the weight of the copolymer and nucleating agent.

The nucleating agents of the present invention provide enhanced properties in blown polyethylene films, especially films blown from polyethylene formed in a process using at least one metallocene catalyst or co-catalyst. An effective amount of nucleating agent, or mixtures thereof, is added to or combined with a polyethylene melt prior to film processing. The effective amount generally ranges from about 0.1 wt % to about 5 wt % based the added weight of the polyethylene and nucleating agent, with the range of about 0.1 wt % to about 0.5 wt % being preferred.

Polyethylene useful in the practice of the invention ranges in melt index from about from about 0.3 dg/min into about 4 dg/min. Melts formed from the polyethylene and the nucleating agents of the invention are compatible with conventional film-blowing equipment. Methods of combining the polyethylene and nucleating agent include melt-homogenization and tumbling powdered polyethylene resin and powdered nucleating agent together in a barrel blender.

The graft copolymers used as nucleating agents in this invention range in density from about 0.92 to about 0.96 g/cm$^3$, with about 0.95 g/cm$^3$ being preferred in the case of ethylene acid and about about 0.92 g/cm$^3$ preferred in the case of maleic anhydride. In the case of the ethylene-maleic anhydride graft copolymers, the copolymer may also contain about 1 to 25 butene branches per thousand carbon atoms, with about 10 to about 18 branches being preferred. The acrylic acid level in the ethylene acrylic acid graft copolymers is about 2 to about 8% with about 5 to about 6% being preferred. The maleic anhydride level in the ethylene maleic anhydride graft copolymer is about 0.25 to about 2%, with about about 1% being preferred. Copolymer nucleating agents useful in the invention range in melt index from about 0.5 dg/min to about 10 dg/min, with about 1 dg/min to about 6 dg/min being preferred.

Table 1 summarizes the hot tack properties of representative Ziegler Natta and metallocene-prepared polyethylene melts that contain nucleating agents of the present invention. Films were blown from four different melts. The melts are labeled samples 1 through 4, respectively. Sample 1 contained metallocene polymerized polyethylene and none of the nucleating agents of the present invention. Sample 2 contained 0.25 wt. % ethylene-acrylic acid co-polymer with the balance being metallocene polymerized polyethylene. Sample 3 contained polyethylene prepared in the presence of a Ziegler-Natta catalyst and none of the nucleating agents of the present invention. Sample 4 contained polyethylene prepared in the presence of a Ziegler-Natta catalyst and 0.25 wt % ethylene-acrylic acid copolymer.

0.001 inch thick low density polyethylene films of specific gravity of 0.917 and melt index of 1.0 were extruded in the form of a cylinder from each sample at a rate of about 150 lineal feet per minute. Melt temperature ranged from about 375 to about 450° C. Hot tack values for each sample were measured as follows. The cylinder films were collapsed to form two identical layers, one above the other, as set forth in the background material on bag formation. Heated narrow bars, one above the upper layer and one below the lower layer, contacted the film to create a region of polymer interdiffusion that joined the upper and lower layer across the width of the collapsed cylinder. The bars were then moved away from the layers. One half second later, the interdiffusion region was subjected to a force directed towards separating the layers in order to cause the interdiffused region to fail. The force, in Newtons, at which the region failed is provided in the table for each sample and at each bar ("seal") temperature tested. Higher failure strength values indicate a higher hot tack at a given temperature.

TABLE 1

| Seal Temperature, C. | Sample 1 | Sample 2 | Sample 3 | Sample 4 |
| --- | --- | --- | --- | --- |
| 85 | 0.089 | 0.081 | 0.263 | 0.081 |
| 95 | 0.517 | 0.962 | 0.828 | 0.722 |
| 100 | 2.263 | 2.809 | 1.316 | 2.806 |
| 105 | 3.070 | 3.736 | 2.232 | 3.962 |
| 110 | 3.434 | 3.852 | 2.821 | 4.034 |
| 115 | 3.640 | 4.475 | 3.781 | 4.307 |

The table shows that for temperatures between 100 and 115° C., between 12 and 24% improvement in hot tack is obtained when the film is formed from a melt in which the nucleating agents of the present invention are added to metallocene polymerized polyethylene. In the case of Ziegler-Natta polymerized polyethylene this improvement ranges from 14 to 113%. These improvements are believed to result from the nucleating agent lowering the crystallization temperature and broadening the melting endotherm.

In summary, it has been discovered that combining a nucleating agent with a polyethylene melt when forming blown films formed from either metallocene-prepared or Ziegler-Natta-prepared polyethylene results in a substantial improvement in hot tack.

While not wishing to be bound by any theory, it is believed that improved hot tack property in metallocene-prepared results from optimizing the melting and crystallization behavior of the material. Accordingly, one way improved hot tack may be achieved is by lowering melting point and increasing the crystallization (solidification) temperature. Table 2 shows the same materials shown in Table 1 with their melting and crystallization temperatures.

TABLE 2

|  | Sample 1 | Sample 2 | Sample 3 | Sample 4 |
| --- | --- | --- | --- | --- |
| Melting Point, C. | 120 | 117.5 | 125.5 | 124.8 |
| Crystallization Temperature, C. | 104.7 | 109.5 | 111.1 | 111.8 |

Improved hot tack is obtained when the material melts at the lowest possible temperature, and crystallizes at the highest possible temperature, so that heat seals can be formed quickly. Table 2 shows that adding ethylene-acrylic acid graft copolymer reduces the window between melting and crystallization for both the metallocene and Ziegler-Natta polymerized material.

What is claimed is:

1. A method for making polyethylene film having improved hot tack seal properties, the method comprising the steps of: (a) forming a composition comprising a polyethylene resin and a nucleating agent selected from the group consisting of dibenzylidene sorbitol, paramethyldibenzylidene sorbitol, dimethyldibenzylidene sorbitol, ethylene copolymers containing grafted maleic anhydride, ethylene copolymers containing grafted acrylic acid, and mixtures thereof; (b) melt-homogenizing said composition; and (c) forming a blown film, wherein said blown film has improved hot seal properties in terms of increased failure strength value compared to a film without said nucleating agent.

2. The method of claim 1 wherein said polyethylene ranges in number averaged melt index from about 0.3 dg/min to about 4 dg/min.

3. The method of claim 1 wherein said nucleating agent is present in an amount ranging form about 0.1 wt % to about 5 wt % based on the combined weight of said polyethylene and said nucleating agent.

4. The method of claim 1 wherein said nucleating agent is an ethylene copolymer containing grafted acrylic acid, said copolymer having a density ranging from about 0.92 to about 0.96 g/cm$^3$ and an acrylic acid concentration ranging from about 2 wt % to about 8 wt % based on the weight of said copolymer.

5. The method of claim 1 wherein said polyethylene is formed in a polymerization process using at least one metallocene catalyst or cocatalyst.

* * * * *